United States Patent [19]

Beshouri et al.

[11] Patent Number: 5,349,046
[45] Date of Patent: Sep. 20, 1994

[54] POLYMERIZATION OF β-LACTONES UNDER RIM CONDITIONS

[75] Inventors: Sharon M. Beshouri; Pui K. Wong; Dale L. Handlin, Jr., all of Houston, Tex.

[73] Assignee: Shell Oil Company, Houston, Tex.

[21] Appl. No.: 984,127

[22] Filed: Dec. 1, 1992

[51] Int. Cl.$^5$ .............................................. C08G 63/08
[52] U.S. Cl. .................... 528/354; 528/357; 528/361
[58] Field of Search ............ 528/353, 354, 355, 357, 528/361; 558/265, 262, 266, 268, 269

[56] References Cited

U.S. PATENT DOCUMENTS

| | | |
|---|---|---|
| 3,471,456 | 10/1969 | Klootwijk et al. |
| 3,558,572 | 1/1971 | Van Der Plas et al. |
| 3,578,700 | 5/1971 | Klootwijk et al. |
| 3,579,489 | 5/1971 | Wagner. |
| 4,029,718 | 6/1977 | Sundet. |
| 4,299,924 | 11/1981 | Nomura et al. |
| 4,379,914 | 4/1983 | Lunberg ................................ 528/354 |
| 4,426,502 | 1/1984 | Minchak. |
| 4,463,168 | 7/1984 | Lunberg ................................ 528/355 |
| 4,582,879 | 4/1986 | Frisch et al. ........................ 525/424 |
| 4,709,069 | 11/1987 | Harris ................................. 558/265 |
| 4,742,128 | 5/1988 | Frisch et al. ........................ 525/424 |
| 4,988,763 | 1/1991 | Kessler et al. |
| 5,100,926 | 3/1992 | Kondo et al. |

FOREIGN PATENT DOCUMENTS

| | | |
|---|---|---|
| 1121153 | 12/1968 | United Kingdom. |
| 1180044 | 2/1970 | United Kingdom. |
| 1384605 | 2/1975 | United Kingdom. |

OTHER PUBLICATIONS

N. R. Mayne, "Polymerization of Pivalolactone," *Advances in Chemistry Series*, 129, ed. N. A. J. Platzer, ACS Press, Washington, D.C. 1973.

"Reaction Injection Molding," *Encyclopedia of Polymer Science & Engineering*, vol. 14, p. 89.

"Reaction Injection Molding," *Encyclopedia of Polymer Science & Engineering*, vol. 14, p. 88.

*Primary Examiner*—Maurice J. Welsh
*Assistant Examiner*—Shelley A. Dodson

[57] ABSTRACT

A method is disclosed for making a molded article of manufacture of polymerized β-lactone which method involves injecting into a mold at least one β-lactone monomer and at least one nucleophilic initiator, substantially polymerizing the β-lactone in the mold and removing the resultant polymerized article from the mold.

19 Claims, No Drawings

POLYMERIZATION OF β-LACTONES UNDER RIM CONDITIONS

FIELD OF THE INVENTION

The present invention relates to a method for polymerizing β-lactones, particularly polymerization within molds to make articles of manufacture of poly(lactones).

BACKGROUND OF THE INVENTION

A β-lactone monomer is a four member cyclic ester having the general formula:

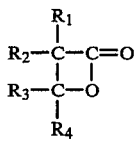

They can be unsubstituted, in which case $R_1$, $R_2$, $R_3$ and $R_4$ are hydrogen, or they can be substituted at any or all of $R_1$, $R_2$, $R_3$ and $R_4$ with hydrocarbyl, e.g., aliphatic, alicyclic, aromatic groups, or selected reactive functional moieties.

The β-lactone ring displays considerable bond-angle strain. Substituted species further strain the ring by creating steric repulsions. These strains make β-lactones suitable for ring opening polymerization.

Contacting the β-lactone monomer with an initiator will open the ring and cause polymerization to occur. The ring opening is dependent upon the type of initiator used. In the presence of an electrophilic initiator, the acyl-oxygen bond is cleaved. In the presence of a nucleophilic initiator, the alkyl-oxygen bond is cleaved. When a nucleophilic initiator is used, a polyester will form as follows:

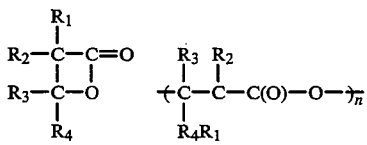

U.S. Pat. No. 4,029,718 discloses that certain randomly grafted copolymers of pivalolactone exhibit good resistance to creep and compression set, high tensile strength, high elastic recovery, and good resistance to high temperature deformation. However, ring opening polymerizations of lactones are exothermic and can develop enough heat to decompose unreacted monomer or produce high-viscosity liquid polymers. Reaction temperatures are best kept below 300° C. to avoid these problems.

A number of methods have been used to polymerize β-lactones. For example, see U.S. Pat. Nos. 3,471,456, 3,558,572, 3,578,700, 3,579,489, U.K. Patent No. 1,180,044, U.K. Patent No. 1,121,153 and U.S. Pat. No. 4,988,763. In each of these methods, β-lactones are polymerized in one or more reactors using bulk or slurry processes prior to the fabrication of articles of manufacture. Care must be taken during polymerization to avoid the monomer decomposition and improper polymer formation that can result from the generation of excessive heat. This is difficult in bulk commercial operations because large reaction vessels are difficult to maintain at uniform temperatures. Cooling such reaction vessels containing large quantities of forming polymer can result in localized cooling and inconsistent polymerization. Further, high temperatures such as those found in these processes can terminate living polymerization systems thereby making polymerization incomplete.

Additionally, bulk and slurry polymer production methods require a manufacturer of polymer articles to either produce feed stock in separate polymer plants or to maintain special reactors for producing it. As used herein, the term "feed stock" refers to polymerized β-lactones that are to be used in a further manufacturing step such as thermoplastic molding. In both bulk and slurry methods, feed stock must be transported to a molding apparatus such as a thermoplastic injection mold before fabrication of an item of manufacture can begin. This may require additional pipes and delivery means from the reactor to mold or actual physical delivery of feed stock from one part of a fabrication facility to another.

Thermoplastic molding techniques often employ molds that are heated to high temperatures to ensure that injected polymers remain liquified and flow throughout the mold. Excessive mold heat should be avoided with β-lactone polymers. Generally, this refers to heat in excess of 300° C. Such extreme mold heats will degrade the polymer feed stock and cause the resulting molded product to display poor mechanical properties.

Reaction injection molding (RIM) is a process used for some polymerization reactions in which polymer is formed directly in a mold. Throughout this specification, RIM will be used to refer to any polymerization process in which the polymerization reaction occurs substantially within a mold. Because polymerization occurs directly in the mold, low filling pressures and mold temperatures are involved which allows for molds to be made of less durable, less expensive materials such as aluminum and castable metals. Separate polymer plants are also not needed.

Suitable reactants which are amenable to mold polymerization processes such as RIM must be low viscosity monomers so that they may be easily injected and flow into a mixhead and mold. Viscosity should be from about 50 to about 1000 centipoise. Other polymer constituents such as catalysts, fillers, and pigments must also have low viscosities or must otherwise be capable of transport into the mold without interfering with the flow of monomer. Ideally, such constituents are soluble in the liquid monomer. Liquid flow must also be uniform so that large cavities in molds can be filled without interruption caused by advance polymerization or excessive polymerization. Further, the monomers and other constituents must not volatilize easily because RIM systems are generally closed and have no capacity to release gaseous products. Volatilization also changes the stoichiometry of the reaction making polymer product nonuniform and giving it unpredictable mechanical properties.

The polymer to be produced in mold polymerization processes must also display some particular mechanical properties. Polymer shrinkage cannot be significant or products will lack detail, be deformed or be otherwise incomplete. Polymerization should be quick. Mold times of less than five minutes are most desirable since each product requires a separate polymerization reaction. Lengthy polymerization times increase the number of molds and apparatuses needed to produce significant quantities of a given polymer product. It is a further requirement that polymers used in this process cannot be negatively impacted by the speed of polymerization.

In RIM and related techniques, polymerization acceleration is often aided by exothermic reaction thermodynamics. However, not all exothermic polymerizations will work in RIM conditions. Some reactions are so exothermic that the heat of reaction will degrade the polymer product or the yet unreacted monomer. This is thermal runaway whereby the rate of heat generation overwhelms the rate of heat removal. Even when thermal runaway does not occur, excessive heat may prolong curing time such that the process becomes uneconomical. Thus, a narrow band of exothermic behavior must exist to obtain desirable polymers with these techniques. The reaction must be exothermic enough to enhance acceleration but not so exothermic as to degrade the monomer or forming polymer. The reaction must also not generate so much heat that molding time is unduly lengthened.

Predicting which polymerization reactions will function well under RIM conditions is not readily reducible to theoretical treatment. It is difficult to find monomers and initiators or catalysts which display all of the requisite qualities such as low viscosity, good flow characteristics, low volatility, an absence of shrinkage on polymerization, quick polymerization, and an absence of morphological deformities upon polymerization. Reactions that appear to be attractive candidates for RIM processes are often found to be unsuitable because they possess additional properties that are undesirable. Often, reactions that are found suitable for RIM polymerization are also found to display other unwanted characteristics. For example, dicylopentadiene, a monomer well known in the art to be capable of RIM polymerization, does not display the solvent resistance required for many polymer applications. Moreover, the monomer exudes a strong unpleasant odor. See *Encyclopedia of Polymer Science and Engineering*, Vol. 14, pg. 89, (Wiley-Interscience, 2 ed. 1987).

Surprisingly, few reactive monomer systems have been found useful in RIM and related techniques because of the lack of predictable behavior and mechanical properties that result. See U.S. Pat. Nos. 4,299,924, 4,426,502 and 5,100,926. See also, *Encyclopedia of Polymer Science and Engineering*, Vol. 14, pg. 88, for a discussion of RIM polymerization of Nylon.

In the present invention, β-lactones, such as pivalolactone, will open in the presence of an initiator and polymerize under RIM conditions. The polymer formed is a polyester. It can possess a high molecular weight, up to 60,000 [as determined by low angle laser light scattering (LALLS)]. Some polymers thus formed are tough solids and exhibit crystallinity.

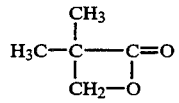

is a β-lactone monomer that can polymerize to form a particularly tough, crystalline polyester with properties similar to Nylon 6 but with a higher heat distortion temperature ("HDT"). It is also superior to Nylon 6 in its resistance to ultraviolet radiation, ozone, most chemicals and water. Polymers which display these improved properties are useful in a large number of applications including automotive parts, housewares, appliances, electrical components, sporting goods, and numerous other products. Most importantly, they are useful in the manufacture of electronics components such as circuit boards.

OBJECTS OF THE INVENTION

It is an object of this invention to provide a process for polymerizing β-lactones such that articles from the formed polymer can be fabricated without separate polymerization and fabrication steps. It is a further object of this invention to provide a process for producing a tough polymer that displays superior resistance to ultraviolet radiation, ozone, and most chemicals relative to Nylon compositions as well as having a higher heat distortion temperature and lessened sensitivity to water.

It is still a further object of this invention to provide a process which lessens the expense of fabricating articles made of polymerized β-lactones as compared to current batch and slurry methods but which results in good polymer properties.

SUMMARY OF THE INVENTION

The present invention comprises a method for making a molded article of manufacture comprising polymerized β-lactone which method comprises injecting into a mold at least one β-lactone monomer and a nucleophilic initiator, polymerizing said β-lactone in said mold and removing the resultant polymerized article from the mold.

A preferred embodiment of the invention is a process for producing polypivalolactone articles comprising impinging or combining pivalolactone monomer with an amine or phosphine initiator and injecting them into a mold in which polymerization then occurs.

DETAILED DESCRIPTION OF THE PREFERRED EMBODIMENTS

The process of the instant invention is particularly directed to polymerization or copolymerization of β-lactones of the general formula:

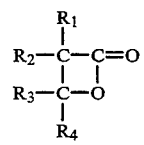

wherein $R_1$, $R_2$, $R_3$ and $R_4$ are individually hydrogen or hydrocarbyl of carbon number ranging from 1 to about 20, preferably from about 1 to about 6, in the presence of one or more nucleophilic initiators. Polymerization occurs under conditions found in a mold. Polymers with excellent properties have been obtained from such monomers and economical and efficient processes have resulted from this invention. The polyester which is the product of the preferred embodiment is a linear polymer having recurring ester structural units primarily of the formula:

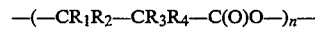

$$-(-CR_1R_2-CR_3R_4-C(O)O-)_n-$$

Copolymerization with other monomers or polymers can also occur. Whenever used in this specification, the terms polymerizing, polymerization and polymer must be understood to also encompass copolymerizing, copolymerization, and copolymer. By copolymerization is understood the joint polymerization of β-lactones with a tertiary or quaternary alpha-carbon atom, either with each other or with other polymerizable compounds. Non-limiting examples of compounds that can be copolymerized are β-lactones with a secondary alpha-carbon atom, and epoxy compounds, such as ethylene oxide, propylene oxide, epichlorohydrin, and glycidyl ethers and esters. Preferably, the β-lactone monomers are selected from the group consisting of propiolactone, β-butyrolactone, pivalolactone and mixtures thereof.

β-lactones exhibit bond angle stress and steric effects due to the close proximity of atoms and functional groups caused by ring formation. Nucleophilic attack (by initiators) at the beta position can open the ring and thus initiate polymerization of esters. Energy is released in the process as evidenced by one or more exotherms. The most preferred embodiments of this invention exhibit exotherms when the β-lactones and initiators are heated from about 60° C. to about 120° C. for about 6 to about 12 seconds after initiation of the reaction. This is typically accomplished by maintaining the mold at a temperature from about 60° C. to about 120° C. The exotherms accelerate the polymerization so that it is complete from about 90 seconds to about 3 minutes after the monomer and initiator are contacted together. Thus, rapid throughput of polymer products can be achieved with the instant invention. This affords considerable economic advantage to this process. Polymerization completion times greater than three minutes occur in other embodiments of this invention.

Most preferred is the polymerization of pivalolactone (α,α-dimethyl-β-propiolactone) in reaction molding conditions. When contacted with a nucleophilic initiator in a closed system such as in RIM, the initiator will attack the molecule and cause ring opening to occur. The resultant macrozwitterion is highly stable which leads to a "living" polymerization system. Propagation or chain growth occurs via the carboxylation anion. The propagation is strongly quantitative and proceeds without chain transfer. See N. R. Mayne, "Polymerization of Pivalolactone", *Advances in Chemistry Series*, 129, ed. N.A.J. Platzer, ACS Press, Washington, D.C., 1973. The calculation of the amount of reactants needed to completely form a molded product is thus reliable and predictable. Further, the resulting polymer displays little shrinkage. Reaction stoichiometry can thus be used to determine the amount of monomer needed to complete molded products. Incompletely formed products and waste due to excess polymer can be avoided.

It is important that the monomers utilized in the instant process be of relatively high purity. It is preferred that they be of purity greater than about 95, preferably 98 percent by weight. They should be substantially free of impurities which adversely effect polymerization such as impurities which quench chain growth or cause chain transfer. Such impurities include acids, esters, water, acyclic ethers and the like.

The amount of nucleophilic initiator utilized generally ranges from about $1.0 \times 10^{-8}$ to about $1.0 \times 10^{-1}$ mole % of the polymer, preferably from about $1.0 \times 10^{-7}$ to about $1.0 \times 10^{-2}$ mole % of the polymer, and most preferably from about $1.0 \times 10^{-6}$ to about $1.0 \times 10^{-3}$ mole % of the polymer. There is no known absolute upper or lower limits to the amount of initiator used. The more initiator used, the lower will be the average molecular weight of the resulting polymer and the faster the rate of polymerization. The less initiator used, the higher will be the average molecular weight but longer time will be required for complete polymerization. In the most preferred embodiment, about 0.5 percent (by weight of polymer) of nucleophilic initiator is added to any quantity of monomer, preferably to pivalolactone. Resulting poly(pivalolactone) is a polymer that is as tough or tougher than Nylon-6 and is more resistant to acids, heat, and ultraviolet light. Generally the initiator is added to the monomer and they are then immediately injected into the mold, although the monomer and initiator can be separately injected into the mold.

Monomer and initiator are best mixed prior to injection in the mold. This mixing may occur in an impingement mixing apparatus typical of that used in conventional RIM molding processes. In this apparatus two streams, one of monomer and one of initiator, are mixed instantaneously in the mixing head of the RIM machine and the resultant mixture is injected into a mold where polymerization takes place and is substantially completed; that is, greater than about 60, preferably greater than about 75 and most preferably greater than about 85 percent polymerization occurs. Sufficient polymerization must occur such that the polymerized article can be removed from the mold, after which time the remaining polymerization can occur. Other embodiments of the invention encompass separately injecting each component into a heated mold. The present invention will not be restricted to these methods of contacting monomer and initiator. Accordingly, more than two streams of reactants may be mixed in any combination in an impingement mixing apparatus or otherwise injected into the mold.

In the instant process since only a relatively small amount of initiator, less than 5 percent by weight, is to be mixed with monomer stream, the conventional impingement mixing apparatus of a conventional RIM machine will in many cases have to by modified to accomplish this mixing of disparate sized streams. Suitable modifications will be readily apparent to one skilled in the art. One modification would be to split the monomer into two more or less equivalent streams and pass them through a conventional impingement head with the initiator being injected into one or both of the monomer streams just prior their entry into the mixing head. Another embodiment would utilize an in-line high shear mixer through which the monomer would pass just prior to injection into the mold with the initiator being injected into or just before the shear mixer. Other embodiments would be apparent to one skilled in the art.

In the preferred embodiment of this invention, molding occurs at temperatures from 75° C. to 150° C., considerably lower than in thermoplastic molding processes. This obviates the need for specially crafted molds made of expensive materials. It further reduces the likelihood of thermal degradation of monomer and finished polymer. Other embodiments of this invention will find that polymerization generally occurs at temperatures from 25° C. to 150° C. Higher reaction temperatures can also accompany some embodiments of this invention but they are best accomplished below 300° C. The temperature at which polymerization occurs can be adjusted by adjusting the temperature of the mold as well as of the monomer.

Nucleophilic initiators are required to carry out the process of the invention. Salts of acids, bases, and metals do not favorably initiate the reaction. Effective nucleophilic initiators are organic compounds of Group Va of the Periodic Table, i.e., nitrogen, phosphorus, arsenic, antimony or bismuth. Preferably the initiators are selected from the group consisting of amines, phosphines, arsines, stibenes, bismuthenes and mixtures thereof. The amines, phosphines, arsines, stibenes and bismuthenes may be primary, secondary or tertiary and may be mono-dentate or poly-dentate. Preferred are tertiary compounds. Most preferred are tertiary amines and phosphines of the formula $R_1R_2R_3Z$ wherein Z is nitrogen or phosphorus and $R_1$, $R_2$ and $R_3$ are hydrocarbyl of 1 to 10 carbon atoms and preferably alkyl and/or aryl.

This reaction is most suitably carried out in an inert environment. Nitrogen or other inert gases can be pumped into the mixhead, mold, or other surfaces with which monomer, initiator or other polymer constituent will contact. This will keep moisture and oxygen off of the polymerizing molecule and avoid early quenching of living molecules.

Other embodiments comprise blending antioxidants, fillers, pigments, coloring agents, flame retardants, plasticizers, elastomers, resins, and a variety of other additives that can provide the polymer with improved mechanical properties. Generally, such additives are to be contacted with the monomer prior to entry into a mold. They should dissolve into the monomer so that the mixture remains a low viscosity, low volatility liquid. So long as these conditions are met, additives may be premixed with any or all of the reaction solutions.

Preferred fillers include milled glass, glass long fibers, glass mat, and mica which may be admixed with the monomer prior to injection into the mold or may be placed in the mold prior to injection with the monomer.

The preferred embodiment of this invention yields polymers which display superior crystallinity (e.g., greater than about 50%, preferably greater than about 60%, and preferably greater than about 75%), toughness, and good solvent resistance. They are found to be soluble in hexafluoroisopropanol.

Molecular weights of the polymers obtained are typically greater than about 20,000, preferably greater than about 30,000. Molecular weights used throughout the instant specification were obtained with low angle laser light scattering [LALLS]. Using this method, samples of β-lactones, prepared according to the present invention, were each dissolved in the solvent 1,1,1,3,3,3-hexafluoroisopropyl alcohol (HFIPA) at a concentration from 0.1% to 0.5% and LALLS measurements were made. The weight-average molecular weight ($M_w$) was determined by using the equation:

$$Kc/\Delta R_\theta = 1/M_w + 2A_2c,$$

wherein $K = 2\pi^2 n^2 (dn/dc)^2 (1 + \cos^2\theta)/\lambda_0^4 N_A$, c is the polymer concentration in units of g/ml, $\Delta R_\theta = R_\theta$(polymer solution)-$R_\theta$(solvent), n is the refractive index of the solvent (for HFIPA, n is 1.275), dn/dc is called the differential refractive index and is the change in the refractive index of the polymer solution with respect to the change in concentration, $\theta$ is the scattering angle, $\lambda_0$ is the wavelength of the incident light beam, and $N_A$ is Avogadro's number. Values of $R_\theta$ are determined as a function of polymer concentration, and processed according to the above equation. The LALLS instrument (Model KMX-6, manufactured by LDC/Milton Roy) measures the intensity of the scattered light as the Rayleigh ratio ($R_\theta$) of a polymer solution, where $$R_\theta = P_\theta/P_0\sigma l,$$

and $P_\theta$ is the photomultiplier signal of light scattered at an angle of $\theta$ relative to the incident light beam, $P_0$ is the photomultiplier signal for the incident light beam, $\sigma$ is the solid angle in the scattering volume that is being viewed by the detection optics, and l is the length of the scattering volume. The reciprocal of the intercept at zero polymer concentration is the weight-average molecular weight, and the slope of the line is proportional to the second virial coefficient $A_2$.

The ranges and limitations provided in the instant specification and claims are those which are believed to particularly point out and distinctly claim the invention. It is, however, understood that other ranges and limitations that perform substantially the same function, in substantially the same way to obtain the same or substantially the same result are intended to be within the scope of the instant invention as defined by the instant specification and claims.

The invention will be described by the following examples which are provided for illustrative purposes and are not to be construed as limiting the invention.

EXAMPLE 1

Pivalolactone monomer was prepared in a flow reactor by thermally splitting acetic acid from β-acetoxypivalic acid in the presence of magnesium on silica as described by Hoechst in UK Patent 1,384,605. About 30 milliliters of monomer were dissolved in an equal amount of diethyl ether. This solution was then washed with 50 ml of sodium bicarbonate solution having pH 9. Aqueous portions were then discarded. The ethereal solution was dried over magnesium sulfate, filtered and the ether was then removed by rotary evaporation. Pivalolactone was distilled under vacuum using a Vigeraux column with a short path distillation head. Pivalolactone was collected from 45°–55° C. at 15 mm Hg. The process was repeated until pivalolactone monomer of equal to or greater than 99% purity was obtained.

Five grams of pivalolactone monomer were added to an oven dried serum bottle under an inert atmosphere in a drybox. Phosphine initiators were added to the monomer by injecting from a syringe through the septum top covering the bottle. Triethyl phosphine, dimethylphosphinoethane ("DMPE"), and tri-n-butylphosphine were each used. Initiator concentrations of from 0.05% by weight of monomer to 0.1% by weight of monomer were used. The bottle containing monomer and initiator was then lowered into a preheated oil bath with temperatures ranging from 60°–120° C. A thermocouple was used to monitor the reaction temperature inside the bottle.

The transparent, colorless monomer solution solidified and became opaque upon polymerization. Additionally, an exotherm accompanied the onset of polymerization which accelerated the reaction without leading to thermal degradation of monomer reactants or polymer products.

The polymers displayed melt temperatures of approximately 230° C. and a molecular weight of approximately 20–60,000 as determined by LALLS.

This example demonstrates that β-lactones polymerize in mold conditions without undesirable impediments such as thermal runaway.

EXAMPLE 2

Pivalolactone monomer was purchased from Lark Enterprises, a custom organic synthesis company in Boston, Mass. Five grams of this monomer was added to an oven dried serum bottle under an inert atmosphere in a drybox. Phosphine initiators were added to the monomer by injection from a syringe through the septum top covering the bottle. Triethyl phosphine, dimethylphosphinoethane ("DMPE"), and tri-n-butylphosphine were each used in separate runs. Initiator concentrations ranged from 0.05% by weight of monomer to 0.1% by weight of monomer. The bottle containing monomer and initiator was then lowered into a preheated oil bath with temperatures ranging from 60°–120° C. A thermocouple was used to monitor the reaction temperature inside the bottle.

The transparent, colorless monomer solution solidified and became opaque upon polymerization. Additionally, an exotherm accompanied the onset of polymerization which accelerated the reaction without leading to thermal degradation of monomer reactants or polymer products. The polymers were found to have molecular weights of approximately 20,000–60,000 as determined by LALLS. The polymers were found to be soluble in hexafluoroisopropanol at ambient temperature. Polymerization onset times and reaction exotherms appear in Table 1.

TABLE 1*

| Sample | Weight % Initiator | tonset (min:sec) | texotherm (min:sec) | Δt (min:sec) | Tmax (°C.) | Tbath (°C.) | ΔT (°C.) |
|---|---|---|---|---|---|---|---|
| 1 | 0.50% | 0:10 | 0:24 | 0:14 | 204 | 122 | 82 |
| 2 | 0.10% | 1:50 | 1:60 | 0:10 | 203 | 80 | 123 |
| 3 | 0.05% | 3:00 | 4:14 | 1:14 | 193 | 80 | 113 |
| 4 | 0.075% | 2:50 | 11:51 | 9:01 | 169 | 70 | 102 |

*Tbath = temperature of bath/mold
Tmax = max temperature reached during polymerization
ΔT = difference between bath/mold temperature and exotherm temperature
tonset = time when monomers reached mold temperature
texotherm = time when max temperature was reached
Δt = time when monomer was at bath/mold temperature until max exotherm was reached The initiator used for Samples 1–4 was tri-n-butylphosphine.

The poly(pivalolactone) herein produced was compared to poly(pivalolactone) purchased from Polysciences, Inc. of Warrington, Penn. The commercially produced species was prepared using prepared using non-RIM methods and denoted "COMP" in Table 2. The melting point for the commercially produced sample was 238° C. as compared to the sample herein produced at 230° C. Crystallization kinetics were measured using a Perkin-Elmer DSC-7, differential scanning calorimeter (DSC). Polymeric samples of 3–7 mg were ground to a uniform particle size and loaded into a DSC pan. The samples were heated at 20 C./min to 35° C. above the melting point, and held at that temperature to ensure complete melting. The samples were then quenched at 100 C./min cooling rate to the chosen crystallization temperature, Tc, which was 63° C. less than the melt temperature, Tm. The commercially produced sample, COMP, exhibited 50% crystallinity versus 75–80% for the samples produced for this example.

The Avrami theory was used to interpret bulk crystallization kinetics data: $1-X(t)=\exp(-Kt^n)$. $X(t)$ is a measure of crystallinity at time $t$. $K$ is a constant, the Avrami rate constant. $n$ is the Avrami number, an exponent describing nucleation and the dimension of crystal growth. The fractional crystallinity growth rate, $V(r)$ describes the crystallization rate of bulk polymer and is the straight line portion of a plot of $X(t)$ over time and $t0.5$ is the crystallization half-time. This is the time required to reach 50% of the equilibrium crystallinity at a particular temperature (here from 175°–185° C.) Comparison of the Avrami rate constants and crystallization half-times of polymers produced according to the this example with commercially procured polymer is presented in Table 2.

This example demonstrates that β-lactones polymerized in mold polymerization conditions display physical characteristics that compare favorably to those produced according to batch or slurry techniques.

TABLE 2*

| Sample | Initiator | t0.5(sec) | n | Tm(°C.) | MW |
|---|---|---|---|---|---|
| COMP | non-RIM | .51 | 2.20 | 238 | 200,000 |
| 1 | .1% | .42 | 1.91 | 230 | 20,000 |
| 2 | .05% | .48 | 2.48 | 230 | 60,000 |

*t0.5 = crystallization half-time; time to reach 50% crystallization
ΔT = difference between melt temperature (Tm) and the crystallization temperature (Tc); for this table ΔT = 63° C.

The initiator used for Samples 1–2 was tri-n-butylphosphine.

EXAMPLE 3

Five grams of pivalolactone monomer purchased from Lark Enterprises, Massachusetts, was combined with 0.05% by weight of monomer tri-n-butylphosphine initiator in a serum bottle stored in a drybox. An aluminum mold was warmed on a hotplate in the drybox to 80° C. The monomer-initiator solution was then syringed into the mold.

An immediate change in state from transparent liquid to opaque solid indicated polymerization had occurred. The mold was removed from the hotplate 5 minutes after injection, another at 30 minutes after injection, and a third at 3 hours after injection. The solid polymer was removed from the mold. In each case, it formed into a hard, round disk in conformity with the shape of the mold and resisted organic solvents except hexafluoroisopropanol.

Polymerization within an actual mold is demonstrated in this example.

EXAMPLE 4

Five grams of pivalolactone monomer purchased from Lark Enterprises was combined with 0.05% by weight of monomer of tri-n-butylphosphine initiator in a serum bottle stored in a drybox. Glass fibers were placed in an aluminum mold which was then warmed on a hotplate in the drybox to 80° C. The monomer-initiator solution was then syringed into the mold.

An immediate change in state from transparent liquid to opaque solid indicated polymerization had occurred in the presence of the glass fibers. The solid polymer was removed from the mold. It was formed into a hard, round disk in conformity with the shape of the mold with the glass fibers infiltrated throughout the polymer.

This example demonstrates the reinforcement of polymers produced according to the present invention.

What is claimed is:

1. A method for making a molded article of manufacture comprising polymerized β-lactone which method comprises injecting into a mold at least one β-lactone monomer and from about $1.0 \times 10^{-8}$ to about $1.0 \times 10^{-1}$ by weight basis monomer of at least one nucleophilic initiator, polymerizing said β-lactone in said mold and removing the resultant polymerized article from the mold.

2. The method of claim 1 wherein the β-lactone has the formula:

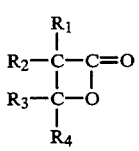

wherein $R_1$, $R_2$, $R_3$ and $R_4$ are individually hydrogen or hydrocarbyl of carbon number ranging from 1 to about 20.

3. The method of claim 2 wherein $R_1$, $R_2$, $R_3$ and $R_4$ are individually hydrogen or hydrocarbyl of carbon number ranging from 1 to about 6.

4. The method of claim 3 wherein the β-lactone monomer is selected from the group consisting of propiolactone, β-butyrolactone, pivalolactone and mixtures thereof.

5. The method of claim 1 wherein the nucleophilic initiator is one or more organic compounds of Group Va of the Periodic Table.

6. The method of claim 5 wherein the nucleophilic initiator is one or more compounds selected from the group consisting of amines, phosphines, arsines, stibenes, bismuthenes and mixtures thereof.

7. The method of claim 6 wherein the nucleophilic initiator has the general formula $R_1R_2R_3Z$ wherein Z is nitrogen or phosphorus and $R_1$, $R_2$ and $R_3$ are hydrocarbyl of 1 to 10 carbon atoms.

8. The method of claim 6 wherein the nucleophilic initiator is selected from tertiary amines, tertiary phosphines and mixtures thereof.

9. The method of claim 1 wherein the initiator comprises from about $1.0 \times 10^{-7}$ to about $1.0 \times 10^{-2}$ mole % of monomer.

10. The method of claim 9 wherein the initiator comprises from about $1.0 \times 10^{-6}$ to about $1.0 \times 10^{-3}$ mole % of monomer.

11. The method of claim 1 wherein said mold is maintained at a temperature of from about 60° C. to about 120° C. prior to injection of monomer and initiator.

12. A polymer article of manufacture produced according to the method of claim 1 having a molecular weight of at least 20,000 as determined by low angle laser light scattering.

13. The polymer article of manufacture produced according to the method of claim 12 having a molecular weight of at least 30,000.

14. A polymer article of manufacture produced according to the method of claim 1 having crystallinity of greater than about fifty percent.

15. The polymer article of manufacture produced according to the method of claim 14 having a crystallinity of greater than about sixty percent.

16. The polymer article of manufacture produced according to the method of claim 16 having a crystallinity of greater than about seventy-five percent.

17. A method for making a molded article of manufacture comprising polymerized β-lactone which method comprises injecting into a mold at least one β-lactone monomer of the formula:

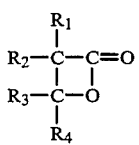

wherein $R_1$, $R_2$, $R_3$ and $R_4$ are individually hydrogen or methyl and from about 0.01 to about 1 percent by weight basis monomer of at least one nucleophilic initiator selected from tertiary amines or tertiary phosphines, polymerizing said β-lactone in said mold and removing the resultant polymerized article from the mold.

18. The method of claim 17 wherein said initiator is selected from a compound having the general formula $R_1R_2R_3Z$ wherein Z is nitrogen or phosphorus and $R_1$, $R_2$ and $R_3$ are hydrocarbyl of 1 to 10 carbon atoms.

19. The method of claim 17 wherein said mold is maintained at a temperature of from about 60° C. to about 120° C. prior to injection of monomer and initiator.

* * * * *